United States Patent
Shiraishi et al.

[11] Patent Number: 6,158,303
[45] Date of Patent: *Dec. 12, 2000

[54] TRANSFER CASE FOR FOUR WHEEL DRIVE VEHICLE

[75] Inventors: Masaru Shiraishi; Hiroaki Hayashi; Ichirou Itou; Yoichi Hiraoka, all of Hiroshima, Japan

[73] Assignee: Mazda Motor Corporation, Hiroshima, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/044,949

[22] Filed: Mar. 20, 1998

[30] Foreign Application Priority Data

Mar. 21, 1997 [JP] Japan .................................. 9-087496
Mar. 31, 1997 [JP] Japan .................................. 9-081106

[51] Int. Cl.[7] ............................................. F16H 37/08
[52] U.S. Cl. ...................... 74/665 T; 475/161; 475/221; 180/233
[58] Field of Search .................... 74/606 R, 665 T; 475/161, 221, 343, 230; 180/233, 248

[56] References Cited

U.S. PATENT DOCUMENTS

| | | | |
|---|---|---|---|
| 3,145,582 | 8/1964 | Wagner | 74/606 R |
| 4,244,241 | 1/1981 | Treadwell | 475/246 |
| 4,682,516 | 7/1987 | Okubo | 475/221 X |
| 4,722,413 | 2/1988 | Okubo | 180/247 |
| 4,817,753 | 4/1989 | Hiketa | 475/221 X |
| 4,876,908 | 10/1989 | Pengilly | 74/410 |
| 4,938,307 | 7/1990 | Sasaki et al. | 75/665 T X |
| 5,000,522 | 3/1991 | Matsuda et al. | 180/248 X |
| 5,098,352 | 3/1992 | Montanaro et al. | 475/86 |
| 5,511,448 | 4/1996 | Kameda et al. | 74/606 R X |
| 5,533,943 | 7/1996 | Ichioka et al. | 475/221 X |

FOREIGN PATENT DOCUMENTS

| | | |
|---|---|---|
| 60-184725 | 12/1985 | Japan . |
| 3-288054 | 12/1991 | Japan . |
| 8-108760 | 4/1996 | Japan . |

*Primary Examiner*—Sherry Estremsky
*Attorney, Agent, or Firm*—Nixon Peabody LLP; Donald R. Studebaker

[57] ABSTRACT

In a transfer case for a four-wheel drive vehicle having a front wheel drive axle assembly which includes a first wheel drive axle shaft arranged in parallel to the engine output shaft and connected to a transmission output shaft through a first helical ring gear meshed with the transmission output gear and a second wheel drive axle assembly which includes a second wheel drive axle arranged in parallel to the engine output shaft and connected to a transfer case through a transfer shaft arranged in parallel to the engine output shaft and equipped with a transfer input gear meshed with a second helical ring gear, the first and second helical ring gears are integrally formed as an integral ring gear and bolted to a differential housing as one whole.

10 Claims, 10 Drawing Sheets

TRANSFER CASE FOR FOUR WHEEL DRIVE VEHICLE

BACKGROUND OF THE INVENTION

1. Field of the Invention

The invention relates to a transfer case for a four wheel drive vehicle.

2. Description of the Related Art

Typically, in a four wheel drive vehicle equipped with an transversely mounted engine to which a transmission is connected has front wheel drive axles or first axles connected to an output shaft of the transmission through a differential and rear wheel drive axles or second axles to which driving power is transferred through a transfer case. Various types of transfer cases or mechanisms have been well known in the art. One type of transfer case includes a pinion bevel gear at an end of a rear wheel drive shaft in direct mesh with a ring gear which is installed to a front differential placed on the front wheel drive axles and meshed with a transmission output gear. A second type of transfer case mechanism includes a transfer shaft equipped with a transfer shaft gear which is meshed with an input ring gear installed to a front differential placed on the front wheel drive axles. Driving power is transferred to a rear wheel drive shaft through the transfer shaft. Another type of transfer case mechanism includes a ring gear installed, separately from the input ring gear, to the front differential placed on the front wheel drive axles. The ring gear is meshed with a transfer shaft gear to transfer driving power to the a rear wheel drive shaft through the transfer shaft.

First type of transfer case mechanism brings about an increase in the vertical position of the rear wheel drive shaft relative to the transfer shaft which imposes constraints compact layout of the power transfer system including the floor tunnel. The second and third types of transfer cases have been proposed to allow high latitude in layout of the rear wheel drive shaft. The second type of transfer case has to incorporate a large diameter of the input ring gear which has no choice but to incorporate a large diameter of the transfer gear in terms of its reduction ratio. This arrangement of these gears make it inevitable to arrange the front wheel drive axle and transfer shaft at a long distance between the axes of rotation, which is always undesirable for overall compactness and high structural rigidity of the transfer case. If arranging the front wheel drive axle and transfer shaft at a short distance between the axes of rotation, the transfer case is hard to provide a desired reduction ratio and causes anomalous sounds due to an increased rotational speed of the transfer shaft.

In contrast to the second type of transfer case, the third type of transfer case incorporating a small diameter of ring gear which is installed, separately from the input ring gear, to the front differential and meshed with the transfer gear permits arrangement of the front wheel drive axle and the transfer shaft at a short distance between the axes of rotation, allowing considerable latitude in the choice of reduction ratios and providing overall compactness and high structural rigidity of the transfer case. One of the transfer cases of this type described in, for example, Japanese Utility Model Publication No. 3- 47927 has two ring gears in mesh with each other, both of which are commonly bolted to a flange of the differential housing. In the transfer case described in the above mentioned Publication, one of the ring gears, which is meshed with the transfer gear, is located outside of the differential housing but in contact with the side surface of the other ring gear, providing compact arrangement around the front wheel drive axle without blocking, for example, an exhaust system. Further, the ring gears bolted to the differential housing are easily detachable and replaced with other ring gears when needed. The replaceable structure of the ring gear set puts the differential housing and its associated parts applicable commonly to different models of vehicles, different types of transmissions, i.e. manual and automatic transmissions which have different demands for transmission torque, or different reduction ratios of transmissions.

However, the fastening bolt by which the two ring gears are commonly secured to the transfer housing subjects to a high external load from both of the ring gears serving as a sharing force. While, in the case where helical ring gears are employed as the ring gears to reduce grinding noises and commonly secured by fastening bolts, they are desirable to have the same direction of the direction of helical threads to cancel thrust forces to which the front wheel drive axle subject from both of the helical gears, the fastening bolts subject to high sharing force and receives the thrust forces as either a compressive load or a tension. For these reason, the transfer case described in the above mentioned Publication has a demand for an increased number of fastening bolts or an increased diameter of fastening bolts which is always undesirable for compactness of the transfer case.

There have been known two types of power transfer system for a four-wheel drive vehicle equipped with a transverse mounted engine,, namely a single shaft type power transfer system and a dual shaft type power transfer system. The single shaft type power transfer system transmits driving power to a propeller shaft directly from a first wheel drive axle (i.e. a front wheel drive axle if the vehicle is of a front engine-front drive type) arranged in parallel to a transmission output shaft. The dual shaft type power transfer system includes a transfer shaft serving as an intermediate power transfer shaft arranged in parallel to the first wheel drive axle through which driving power is transmitted to the propeller shaft. The dual shaft type power transfer system has an advantage that the propeller shaft can be positioned at a vertical height by positioning the transfer shaft at a lower vertical height than the first wheel drive axle, which is always desirable to avoid the drawback that a floor tunnel covering the propeller shaft juts out into the interior of the vehicle and consequently exerts adverse effect on spaciousness of the passenger compartment.

Dual shaft type power transfer system of the four wheel drive vehicle which transmits driving power to the transfer shaft through a differential disposed between, for example, the front wheel drive axles via the transmission has a power transmission path turned at a right angle before the propeller shaft. For providing the power transmission path turned at a right angle, the transfer shaft must be combined with a transfer output shaft extending perpendicularly to the transfer shaft and aligned coaxially with the propeller shaft. Power transmission between these two shafts is usually achieved by means of bevel gears or hypoid gears. This type of transfer case is enclosed in a housing closed up tightly and filled with lubrication oil for smooth operation of the bevel gears and bearings supporting the shafts. In order to hold the inside of the housing at a specified pressure, a breather is installed to the, housing as known from, for example, Japanese Unexamined Patent Publication No. 3-288054.

When installing the transfer case to the dual shaft type power transfer system, it is a typical way to install a transfer housing with a transfer output shaft attached thereto to a transmission housing after attaching a transfer shaft from the side of on which a propeller shaft. In order for the bevel gears mounted on the transfer shafts, respectively, to be prevented from causing frictional wear and generating the sound of grinding gear, these gears must be adjusted in three dimensional position to provide desired gear contact as accurate as possible. For this purpose, the utilization is made of shims to compensate manufacturing errors of parts. In the case where the transfer housing is installed to the transmission housing from the side of the propeller shaft, it is necessary to accurately control torque for fastening the transfer housing to the transmission housing and the thickness of shim.

There has been proposed a transfer case with an aim to simplify installation of the transfer case to the power transfer system as described in, for example, Japanese Unexamined Patent Publication No. 8-108760. According to the Publication, a sub-assembly of a housing and shafts, bearings and bevel gears adjusted suitably in gear contact assembled to a transfer case unit incorporated in the housing is prepared and fixedly attached to a transmission housing from one side.

While the transfer case housing having the transfer shaft to which driving power is transmitted from an engine through a transmission unit including a differential is desirable to lay as close to the transmission unit as possible in view of overall compactness of the power transfer system, if located closely to both the engine and transmission unit, the lubrication oil in the transfer case suffers not only heating due to friction by the shafts but heat radiated from the engine and rises its temperature, which possibly causes a decline of lubrication performance. One of possible measures is to provide the transfer case with a cooling means. A temperature rise of the interior of the transfer case depends greatly upon the rotational speed of shaft, thermal energy radiated from the engine and the relative position of the transfer case to the engine which are different among models of vehicle to which the power transfer system or the transfer case is installed. Accordingly, if the transfer housing is unified with the cooling means, it is hard to provide the transfer case commonly for different types of power transfer system. Similarly, if the transfer housing is unified with the breather, it is hard to provide the transfer case commonly for different types of power transfer system.

SUMMARY OF THE INVENTION

It is an objective of the invention to provide a transfer case which reduces sharing load applied to bolts for securing a transfer housing to a differential housing.

It is another object of the invention to provide a transfer case commonly installed to power transfer systems for different models of four-wheel drive vehicles.

It is another object of the invention to provide a transfer case equipped with a cooling means easily replaceable with another.

It is still another object of the invention to provide a transfer case equipped with a breather easily removable.

The foregoing objects of the present invention are achieved by providing a transfer case for a four-wheel drive vehicle which is equipped with a transversely mounted engine and a transmission connected to the engine through an engine output shaft and to a differential through a transmission output gear and has a first wheel drive axle assembly including a first wheel drive axle shaft arranged in parallel to the engine output shaft and connected to a transmission output shaft through a first helical ring gear meshed with the transmission output gear and a second wheel drive axle assembly including a second wheel drive axle arranged in parallel to the engine output shaft and connected to a transfer case through a transfer shaft arranged in parallel to the engine output shaft and equipped with a transfer input gear meshed with a second helical ring gear, the transfer case being characterized in that the first and second helical ring gears are integrally formed as an integral ring gear and bolted to a differential housing as one whole.

Transfer case increases the latitude in choice of vertical position of the shaft through which driving power is transmitted to rear wheel drive axles and the latitude in choice of reduction ratio, and makes it possible to arrange the front wheel drive axles and the transfer shaft at a long distance, as a result of which the overall compactness and high structural rigidity of the transfer case are realized. The compact arrangement of the transfer case around the front wheel drive axle does not block, for example, an exhaust system. Further, the differential is commonly applied to power transfer systems for different models of four-wheel drive vehicle which have different reduction ratios and transmission torque by replacing the ring gears only. The helical ring gears having the same direction of helical threads are employed as the first and second ring gears with an effect of preventing or significantly reducing sounds of grinding gears and canceling thrust force on the first wheel drive axles. The integral structure of the first and second ring gears cancels torque exerted( thereon to reduce sharing force applied to the fastening bolts, which is desirable for reducing the number of fastening bolts or using a small diameter of fastening bolts, so as to provide the overall compactness of the transfer case.

Integral gear is desirably bolted at the first helical ring gear which receives large input torque and tends to get slanted due to thrust force to the differential housing. This keeps the first ring gear remaining accurately meshed with the counter gear and provides a significant reduction in sharing force applied to the fastening bolts, which is desirable for reducing the number of fastening bolts or using a small diameter or a short length of fastening bolts. The shafts and gears are installed into the transfer housing through the opening to provide a sub-assembly so as to be ready to be attached to the transmission.

First helical ring gear may have a facewidth larger than the second helical ring gear with an effect of making the transfer case more compact.

Differential housing may be divided into two housing sections formed with mating flanges, respectively. The divided differential housing permits the two housing sections and the integral ring gear to be fixedly coupled all together by bolting the mating flanges. This is realized by means of the transfer structure which applies only significantly reduced sharing force to the fastening bolts. In this case, the flange is formed at part of the housing which is hard to be subjected to torsional stress so as to reduce a slip between the flanges as small as possible, thereby reducing sharing force applied to the fastening bolts.

The transfer case has a transfer housing formed with an opening through which shafts and gears are installed and which is closed by a detachable cover. The detachable cover may be provided with a cooling means such as integral fins for cooling the temperature of lubrication oil in the transfer case and/or a breather means for keeping interior pressure in the transfer housing lower than a specified pressure level.

Utilization of the detachable cover with an integral cooling means and or a breather means permits the transfer case to be applied commonly to power transfer systems for different models of four-wheel drive vehicle which are different in thermal conditions by replacing the detachable cover with others suitably designed for the different thermal conditions. Further, the detachable cover with cooling fins formed integrally therewith is easy to produce by casting or the like.

Cooling means is preferably disposed as close to the transfer gears as possibly, and the breather means is preferably disposed as far from the transfer gears with respect to the cooling means as possible. The breather means is less splashed with lubrication oil by the hypoid gears and getting clogged with the oil and dust. By using a detachable cover having a cooling means and a breather means suitably located according to a position toward which lubrication oil splashes are directed by the gears meshed with each other, the transfer case is applied commonly to power transfer systems for different models of four-wheel drive vehicle.

BRIEF DESCRIPTION OF THE DRAWINGS

The foregoing and other objects and features of the present invention will be clearly understood from the following detailed description of preferred embodiments when read in conjunction with the accompanying drawings in which same reference numerals have been used to denote the same or similar elements or parts throughout the drawings, and wherein.

DETAILED DESCRIPTION OF THE PREFERRED EMBODIMENT

Parts which are not of direct importance to the invention and parts which are purely of conventional construction will not be described in detail. For example, details of the transmission, the torque converter, the clutches the front and rear axle assemblies, etc. which are necessary to the power transfer system will not be set out in detail since their construction and operation can easily be arrived by those skilled in the art.

In the following description, parts which are not of direct importance to the invention and parts which are purely of conventional construction and operation will not be described in detail. For example, details of the transmission gear mechanism, the torque converter, etc. which are necessary to the power transfer system will not be set out in details since their construction and operation can easily be arrived at by those skilled in the art.

Figure 1:
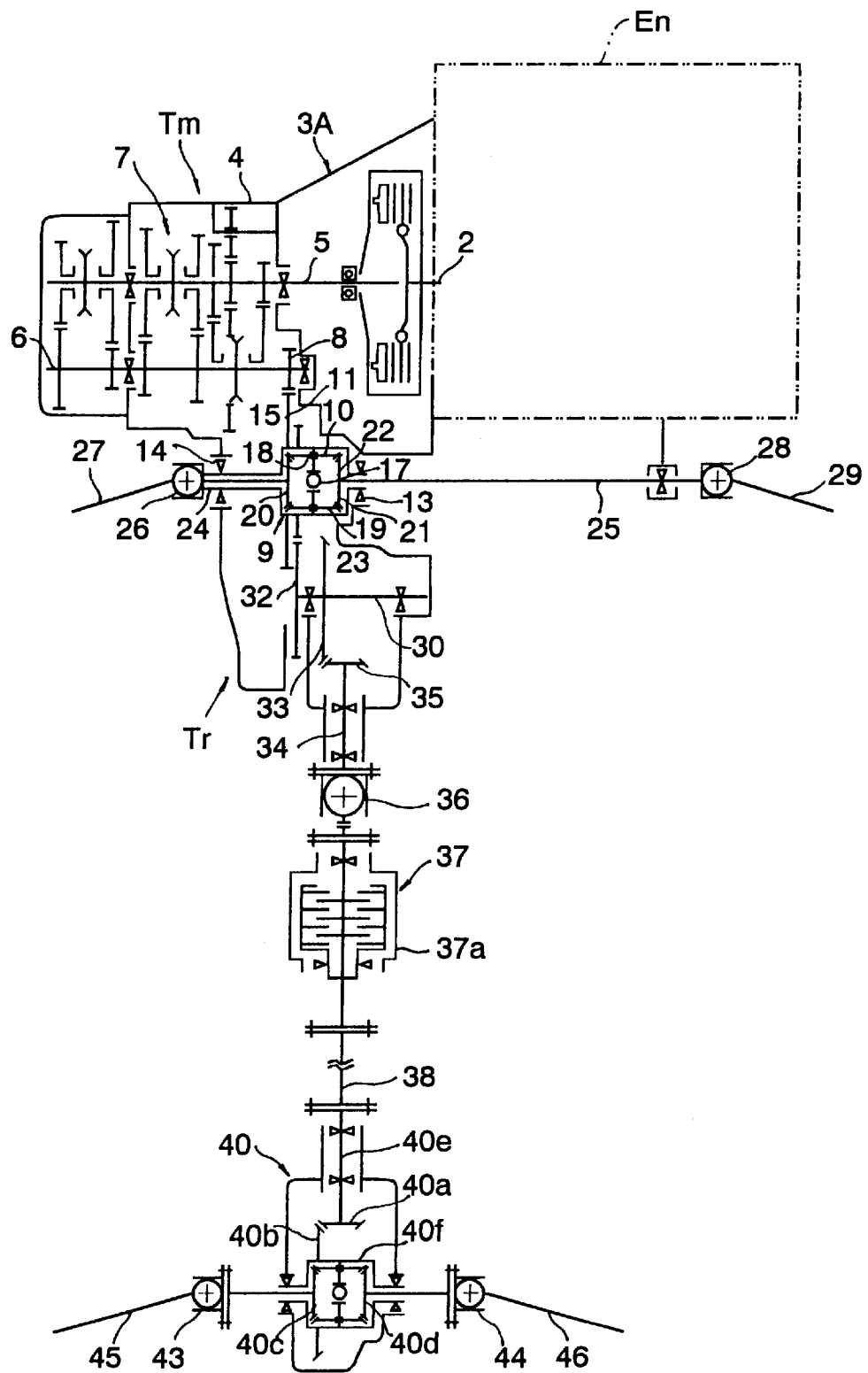
FIG. 1 is a schematic skeleton view of a power transfer system incorporating a transfer case in accordance with an embodiment of the invention for a four-wheel drive vehicle.
Figure 2:
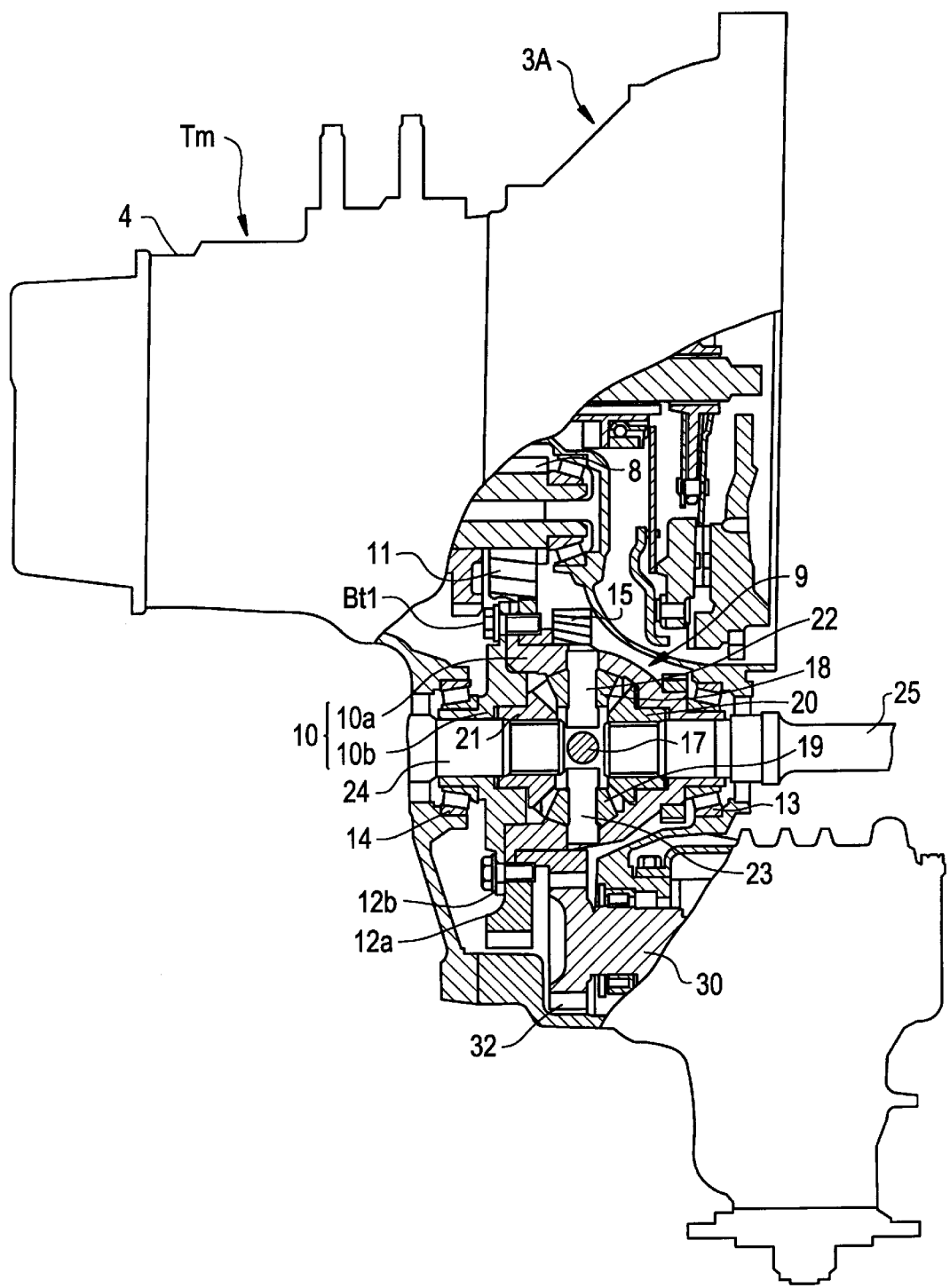
FIG. 2 is a cross-sectional view of the transfer case.

Referring to the drawings in detail and, in particular, to FIGS. 1 and 2 schematically showing a transfer case according to an embodiment of the invention which is installed in a four wheel drive vehicle, a transversely mounted engine En, which is referred to an engine having its output shaft directed transversely in an engine compartment, is directly connected to a manual transmission Tm in a straight line through a mechanical connection between an engine output shaft 2 and an engine clutch 3A. This manual transmission Tm has two parallel transmission shafts, namely a primary transmission shaft or transmission input shaft 5 which mechanically connected to the engine output shaft 2 by means of the engine clutch 3A and a secondary transmission shaft or transmission output shaft 6 enclosed in a transmission housing 4. The transmission input shaft 5 mounts drive gears thereon, and the transmission output gear 6 mounts the counter or cluster gears thereon. Combinations of these gears 7 provide first to fourth forward gears and a reverse gear according to selected shift positions to transmit engine output torque from the transmission input shaft 5 to the transmission output shaft 6. The transmission output shaft 6 at one of its ends is equipped with a transmission output gear 8. A four-pinion type of front wheel drive axle assembly including a front differential 9 has a differential first gear such as a helical ring gear 11 secured to a differential housing 10 and meshed with the transmission output gear 8. The differential housing 10 comprises two sections, namely a generally bowl-shaped housing section 10a and a mating lid section 10b. The housing sections 10a and 10b are integrally formed with mating flanges 12a and 12b to mate each other and supported for rotation by bearings 13 and 14.

A differential second gear such as a helical ring gear 15, which is integrated with the differential first ring gear 11 by a bridge 11a as an integral gear assembly, has the same direction of helical threads as the differential first ring gear 11 and is meshed with an input gear of a transfer shaft which will be described later. The differential second ring gear 15 has a smaller diameter and a small facewidth than the differential first ring gear 11. This integral gear assembly 11, 15 is fitted to the generally bowl-shaped housing section 10a with the differential first gear section 11 leaning against a shoulder formed behind a flange of the generally bowl-shaped housing section 10a. These housing sections 10 and 10b and the integral gear assembly 11, 15 are fixedly coupled all together by fastening the mating flanges 12a and 12b of the housing sections 10a and 10b and the bridge 11a of the integral gear assembly 11–15 by fastening bolts Bt1.

Four bevel pinion gears 18–21 are disposed within the front transfer housing 10 to engage one another. Two pinion gears 18 and 19 opposite to each other are mounted for rotation on pinion shafts 22 and 23 secured to the generally bowl-shaped housing section 10a. The other two pinion gears 20 and 21, namely splined axle side gears, are placed on inner splined ends of right and left front wheel drive axles 24 and 25, respectively. Each front wheel drive axle 24, 25 is connected to a front wheel drive shaft 27, 28 by means of a constant velocity joint 26, 28.

Power transfer system incorporates a transfer case unit Tr having a transfer shaft 30 extending in parallel with the front wheel drive axles 24 and 25. The transfer shaft 30 at one of its opposite ends is provided with a transfer input gear 32 in mesh with the differential second ring gear 15 and an internal splined transfer output gear 33 such as a bevel gear or hypoid gear meshed with a pinion gear 35 which turns the power transmission path at a right angle to a rear differential 39. The transfer output gear 33 is fixedly connected to the rear differential 39 through a drive or propeller shaft 38. Specifically, the transfer output gear 33 is directly connected to a transfer output shaft 34 which is connected to the propeller shaft 38 through a constant velocity joint 36 and a clutch 37 admitted in a clutch housing 37a which is hydraulically or electromagnetically controlled to connect transmission of the engine output torque to a rear wheel drive axle assembly or disconnect transmission of the engine output torque from the rear wheel drive axle assembly according driving conditions including running speed, engine throttle position and four wheel driving when needed. The propeller shaft 38 is connected to a drive axle pinion shaft 40e to which a ring gear pinion gear 40a meshed with an input ring gear 40b. Two pinion gears 40c and 40d, namely splined axle side gears, disposed within a differential housing 40f are placed on inner splined ends of right and left rear wheel drive axles 41 and 42, respectively. Each rear wheel drive axle 41, 42 is connected to a rear wheel drive shaft 45, 46 by means of a constant velocity joint 43, 44.

Figure 3:
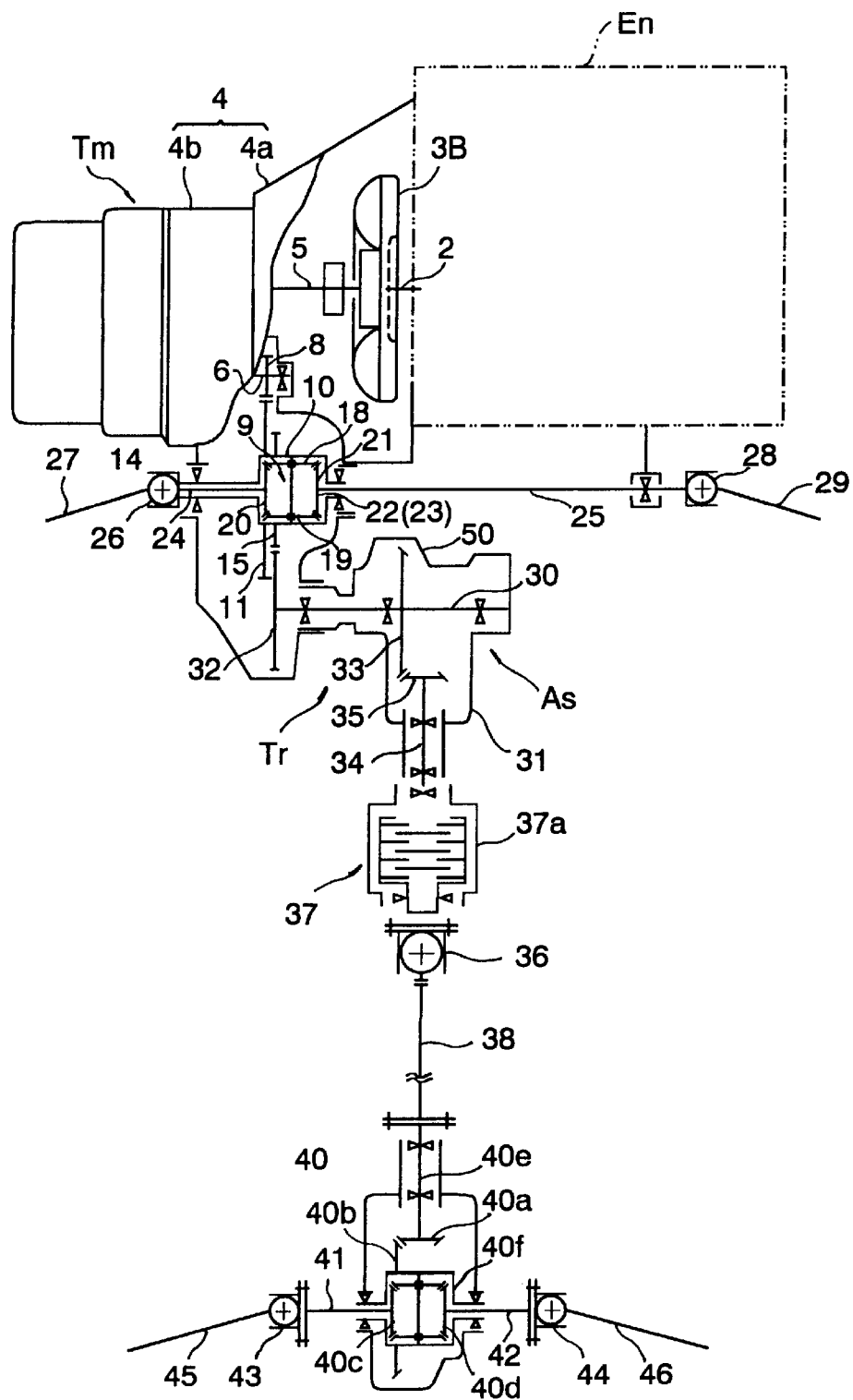
FIG. 3 is a schematic skeleton view of a power transfer system incorporating a transfer case in accordance with another embodiment of the invention for a four-wheel drive vehicle.
Figure 4:
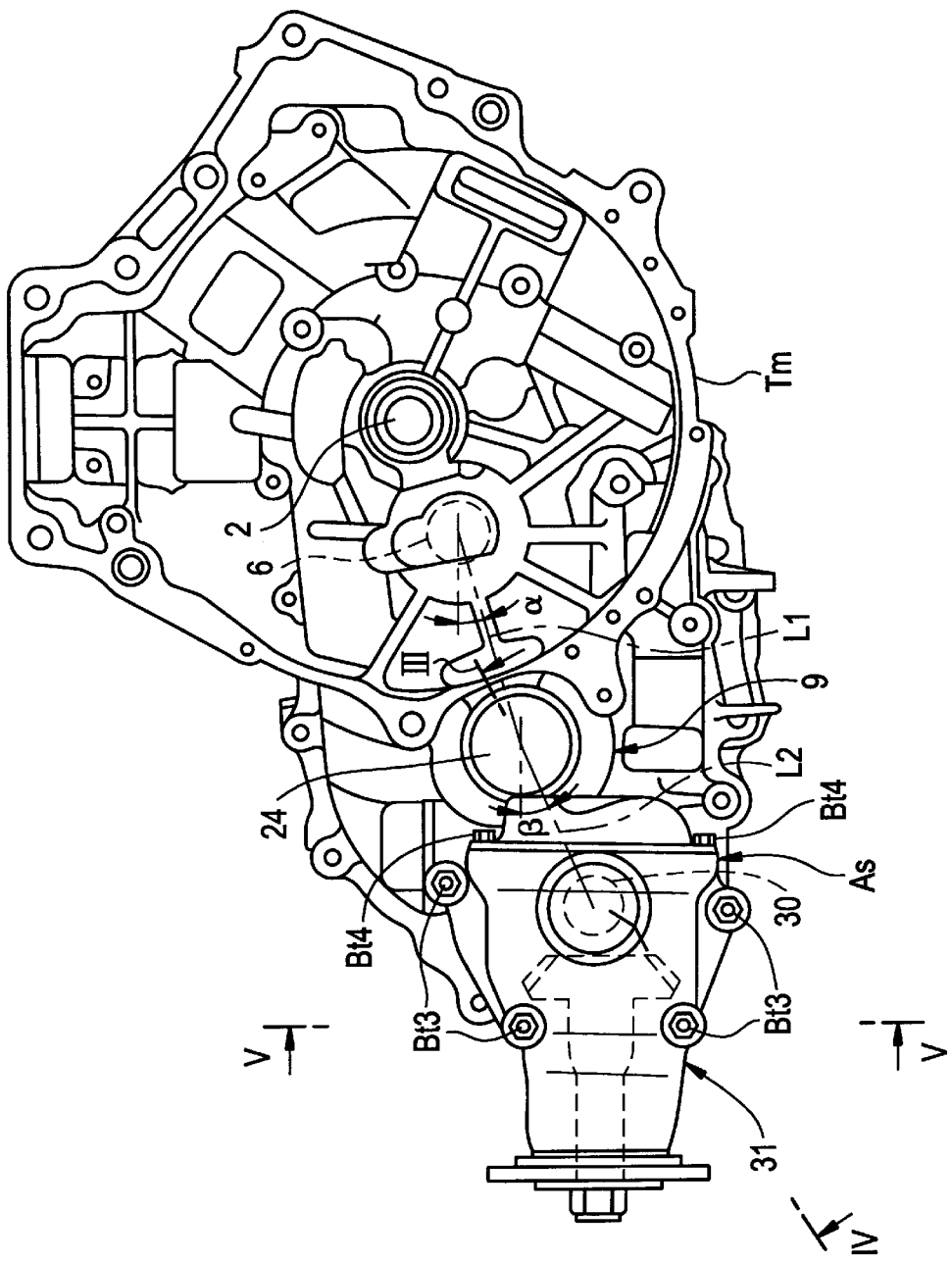
FIG. 4 is a side view of the power transfer system of FIG. 3.
Figure 5:
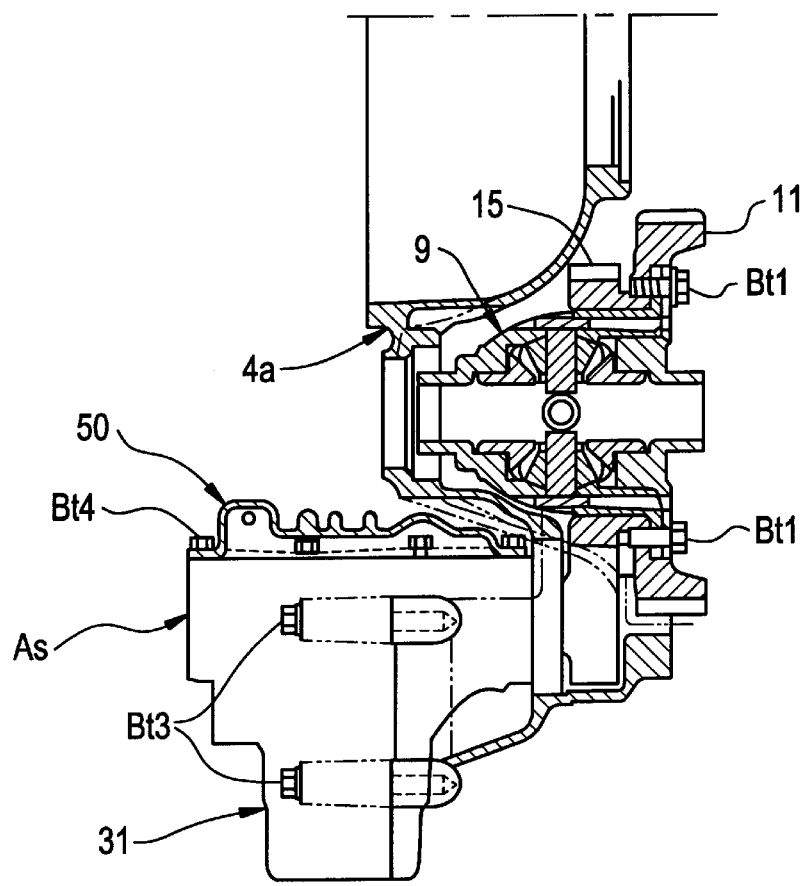
FIG. 5 is a cross-sectional view of the power transfer system of FIG. 4 taken along line V—V.
Figure 6:
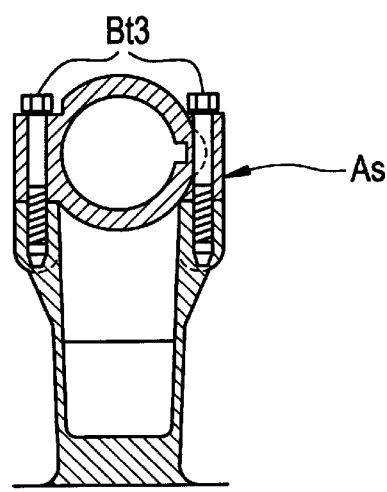
FIG. 6 is a cross-sectional view of the power transfer system of FIG. 4 taken along line VI—VI.

FIGS. 3 and 4 schematically showing a transfer case according to another embodiment of the invention which is installed in a four wheel drive vehicle, a transversely mounted engine En directly connected to an automatic transmission Tm by means of a mechanical connection between an engine output shaft 2 and a torque converter 3B encased within a transmission housing 4. This transmission housing 4 comprises a torque converter housing 4a in which the torque converter 3B is placed and a transmission housing 4b in which a transmission gear mechanism (not shown) is placed. The torque converter housing 4a, which has a diameter as large as enough to accept the bulky torque converter 3B, is directly adjacent to the engine En and shaped to jut back from the engine En as viewed from the top of the vehicle body.

A front wheel drive axle assembly includes a front differential 9 which differentially transmits engine output torque from the engine En to front wheels (not shown). A transmission output shaft 6 of the automatic transmission Tm fixedly mounts an output gear 5 of the transmission gear thereon and is in mesh with a differential first ring gear 11 which forms a part of the front axle drive mechanism, and has a relatively large diameter. This differential first ring gear 11 is bolted, or otherwise fixedly fitted, to a differential housing 10 of the front differential 9. Front wheel drive axles 24 and 25 at their inner ends are coupled to splined axle side gears 20 and 21 supported by the differential housing 10, respectively, and extend transversely in parallel to the transmission output shaft 6 from the front differential 9. Each front wheel drive axle 24, 25 at its outer end is connected to a front drive axle 27, 29 through a constant velocity joint 26, 28.

A transfer case unit Tr, which comprises various shafts and gears admitted in a transfer housing 31 bolted, or otherwise secured, to the transmission housing 4, is equipped lower behind the front differential 9 to provide driving power for the rear wheel drive axle assembly when needed. As seen in FIG. 4, the transfer case unit Tr has a transfer input shaft 30 directed transversely in parallel to the front wheel drive axles 24, 25 and placed at an elevation lower than the front wheel drive axles 24, 25. As compared with a transfer case of the type having a single shaft through which driving power is input directly from front axle shaft, the transfer case unit Tr makes contribution to placing a propeller shaft 38 in a lower vertical position. In this embodiment, these automatic transmission Tm, front differential 9 and transfer case unit Tr are arranged in relative positions such that the center axes of rotation of the transmission output shaft 6 and the front wheel drive axles 24, 25 are on a straight line L1 at an angle a relative to a horizontal line and the center axes of rotation of the front wheel drive axles 24, 25 and the transfer input shaft 30 are on a straight line L2 at an angle β relative to a horizontal line which is greater than the angle α. The transfer input shaft 30 is connected to the differential housing 10 of the front differential 9 through gears 15 and 32 in mesh with each other. The differential second ring gear 15 is fixedly mounted on the differential housing 10, and the transfer input gear 32 is fixedly supported on, or formed as an integral part of, one end of the transfer input shaft 30. The transfer output gear 33 such as a bevel ring gear and a hypoid ring gear is placed on the splined outer end of the transfer input shaft 30. A hypoid pinion gear 35 is fixedly secured to, or otherwise formed integrally with, one end of a transfer output shaft 34 which extends backward at a right angle relative to the transfer input shaft 30 from the transfer case unit Tr and is meshed with the transfer output gear 33. The transfer output shaft 34 is connected to a propeller shaft 38 through a clutch 37 which is hydraulically or electromagnetically controlled to connect transmission of the engine output torque to a rear wheel drive axle assembly or disconnect transmission of the engine output torque from the rear wheel drive axle assembly according driving conditions including running speed, engine throttle position and four wheel driving. The clutch 37 is admitted in a clutch housing 37a secured to the transfer housing 31. Because, as is well known, the hypoid gear set 33 and 35 provides a vertical offset between their center axes of rotation, the center axis of rotation of the pinion gear 35 can be placed in a lower vertical position than the center axis of rotation of the transfer output gear 33, and hence the transfer output shaft 34 and the propeller shaft 38, which is always desirable to reduce the height of a floor tunnel.

A rear wheel drive axle assembly includes a rear differential 40 which differentially transmits engine output torque from the engine En to rear wheels (not shown). Rear wheel drive axles 41, 42 at their inner ends are coupled to splined axle side gears 40c, 40d supported by a differential housing 40f of the rear differential 40, respectively, and extend transversely in parallel to the transmission output shaft 6 from the rear differential 40. Each rear wheel drive axle 41, 42 at its outer end is connected to a rear wheel drive shaft 45, 46 through a constant velocity joint 43, 44. Specifically, the propeller shaft 38 at its rear end is connected to an axle drive pinion shaft 40e equipped with a ring gear pinon gear 40a such as a bevel gear and a hypoid gear. The ring gear pinion gear 27 is meshed with an input ring gear 40b such as a bevel gear and a hypoid gear. This input ring gear 40b is bolted, or otherwise fixedly fitted, to the differential housing 40f of the rear differential 40.

Figure 7:
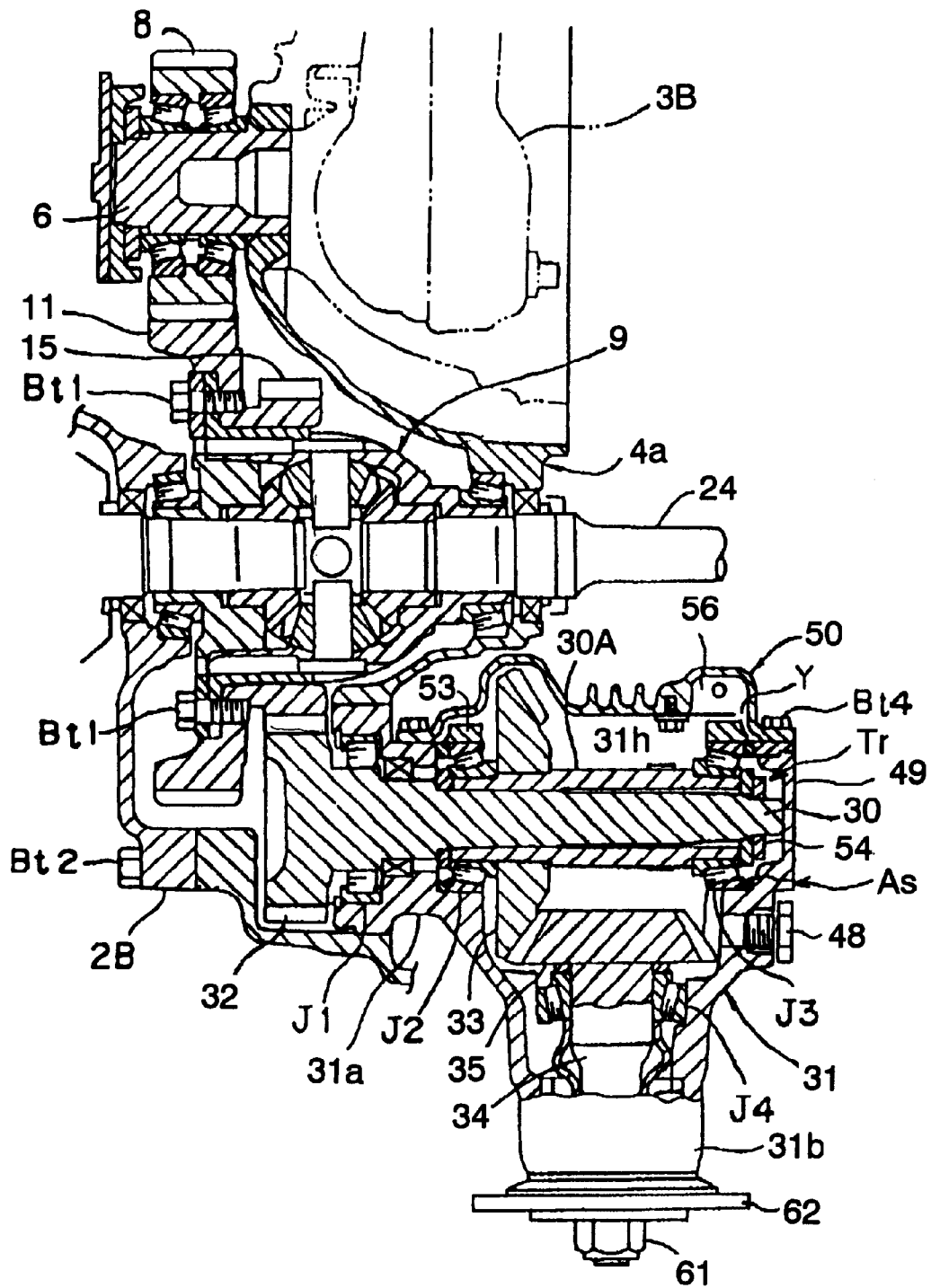
FIG. 7 is a cross-sectional view of the transfer case.
Figure 8:
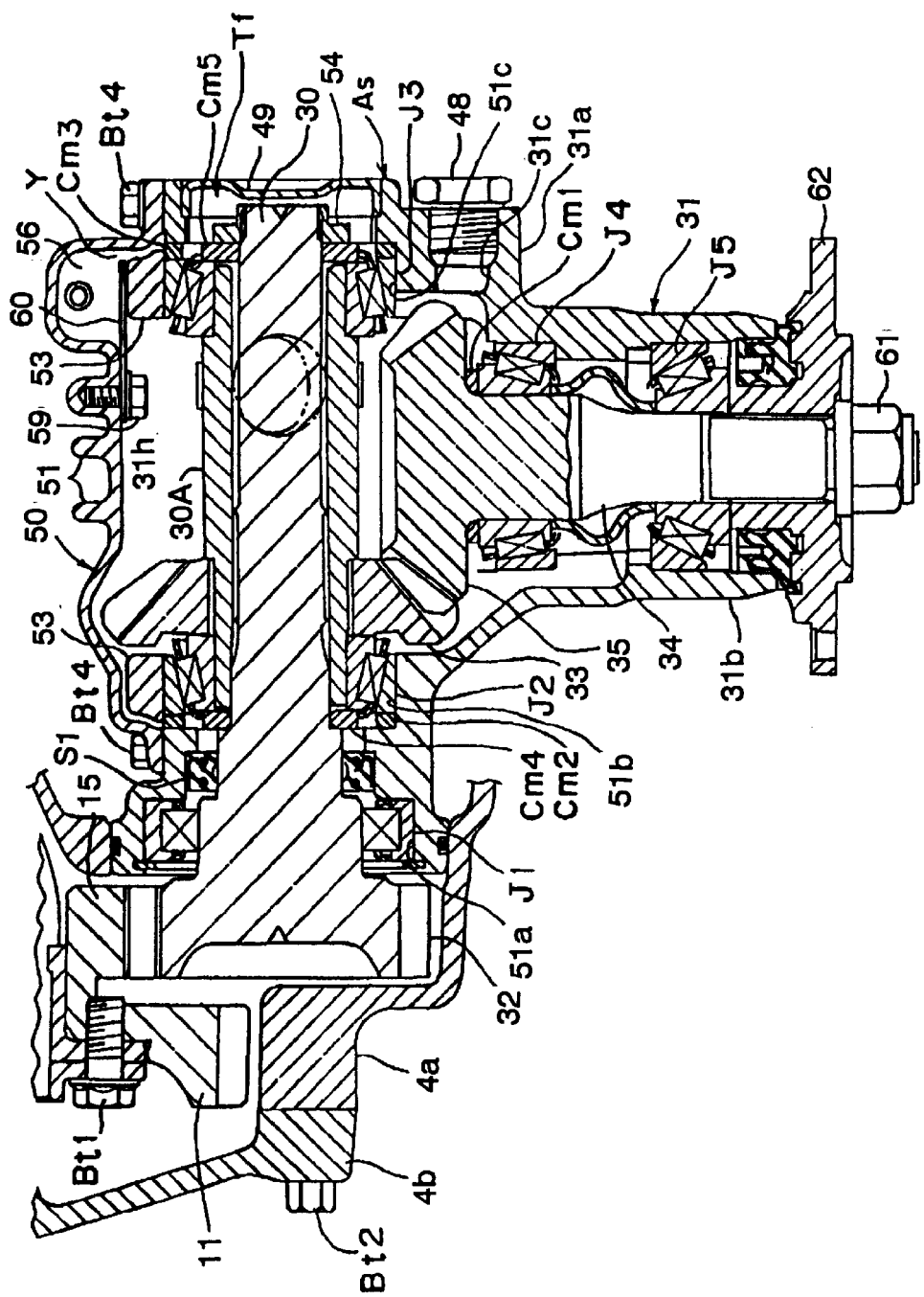
FIG. 8 is an enlarged cross-sectional view of an essential part of the transfer case.
Figure 9:
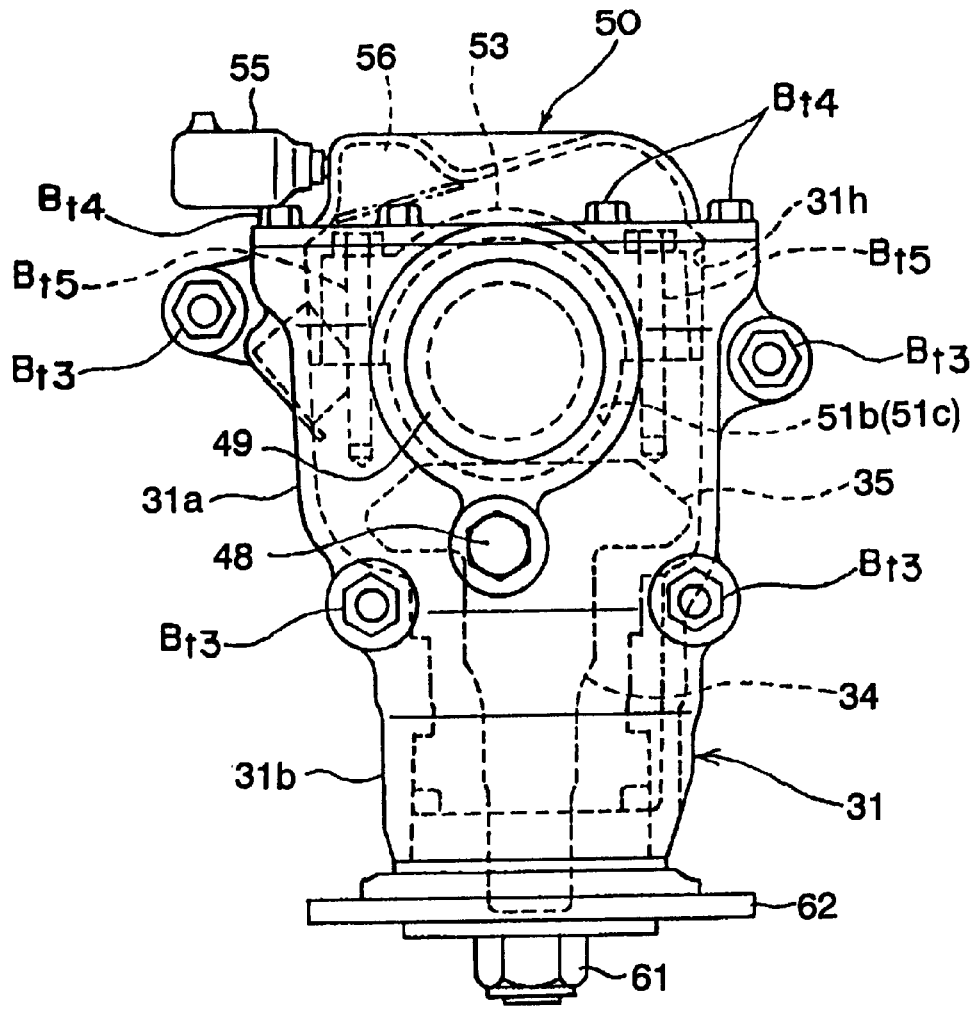
FIG. 9 is a side view of the transfer case.

Referring to FIGS. 7 through 9 showing details of the transfer case unit Tr, the transfer housing 31 is secured to a rear side of the torque converter housing 4a. As clearly shown in FIG. 7, the rear portion of the torque converter housing 4a opens laterally in a longitudinal direction from the front to the back of the vehicle body and admits the front differential 9 partly. The differential first and second ring gears 11 and 15 partly project out of the torque converter housing 4a through the opening. These differential first and second ring gears 11 and 15, integrally formed as one whole, are bolted to the differential housing 10 by a plurality of bolts Bt1. The transfer housing 31 comprises a transverse housing section 31a in which the transfer input shaft 30 is received and a longitudinal cylindrical housing section 31b in which the transfer output shaft 34 is received, these housing sections 31a and 31b being integrally L-shaped. The transfer housing 31 is provided with a front opening 31h which provides access into the interior of the transverse housing section 31a. A front cover 50 is bolted to the transfer housing 31 by fastening bolts Bt4 to close the front opening 31h. The transfer input shaft 30 is supported for rotation by transfer housing 31 through three bearings J1, J2 and J3 arranged separately in the axial direction of the shaft. The transfer input shaft 30 is provided with the transfer input gear 32 formed as an integral part at its one end and the transfer output gear 33 fixedly mounted on its mid-portion. One of the three bearings J1–J3, namely a central conical roller bearing J2 is disposed in close proximity to the transfer output gear 33. The transverse housing section 31a is provided with an annular bearing support 51a for supporting the cylindrical roller bearing J1 disposed in close proximity to the input gear 14 and semi-circular annual bearing supports 51b and 51c for supporting the conical roller bearings J2 and J3 disposed at the mid-portion and another end of the transfer input gear 32. As clearly shown in FIG. 7, semi-circular caps 53 are secured to the transverse housing section 31a by bolts Bt5 to cover these conical roller bearings J2 and J3 fitted in the bearing supports 51b and 51c, respectively. The transfer output shaft 34 is supported by the cylindrical housing section 31b through conical roller bearings J4 and J5.

Transfer output gear 33 and the conical roller bearings J2 and J3 are practically secured to an internal and external splined hollow sleeve 30A which is fitted onto and mechanically coupled to the transfer shaft 30 together. Inner races of the roller bearings J1 and J2 are press fitted to the opposite ends of the hollow sleeve 30A at the opposite ends. The hollow sleeve 30A, and hence the transfer shaft 30, is supported for rotation by the transfer housing 31 through the conical roller bearings 32 and J3. In order to adjust tooth bearing between the hypoid gears 33 and 35, there are disposed shims Cm2–Cm5 on outer sides of the respective conical roller bearings J2 and J3. The shim Cm5 is pressed against the inner race of the conical roller bearing J3 by a ring fastener or fastening nut 54 fastened to the end of the transfer shaft 30. The end of the transfer shaft 30 is covered by a side cover 49. Further, there is disposed a shim Cm1 pressed against the inner race of the conical roller bearing J4 fitted to the cylindrical housing section 31b to hold the transfer output shaft 34.

Lubrication oils used in the power transfer system of this embodiment are different between the transfer case unit Tr and the automatic transmission Tm. A low viscosity oil is employed for the automatic transmission Tm in order to meet the requirements that the transmission oil must work as working oil to provide a working pressure for operating parts such as valve spools as well as lubricate sliding parts, flanks of meshed gears, etc. On the other hand, a high viscosity oil is employed for the transfer case unit Tr because the transfer lubrication oil lubricates the hypoid gears 33 and 35 in mesh with each other which are subjected to significantly heavy load and must have a high withstanding load. In order to separate the interior of the transfer case unit Tr including the hypoid gears 33 and 35 from the interior of the automatic transmission Tm and to seal these interiors hermetically, an annular sealing ring S1 is disposed between the roller bearings J1 and J2 and fitted tight between the transfer shaft 30 and an inner wall of the transfer chousing 31. The transfer housing 31 has a drain port 31c usually closed by a plug 48. The transfer oil can be drained through the drain port 31c for oil replacement when needed.

Figure 10:
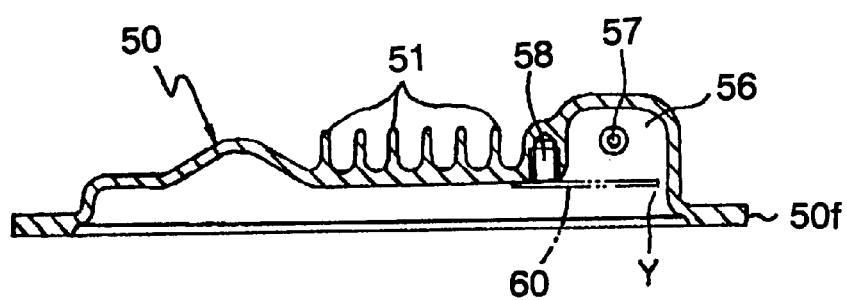
FIG. 10 is a cross-sectional view of a front cover.
Figure 11:
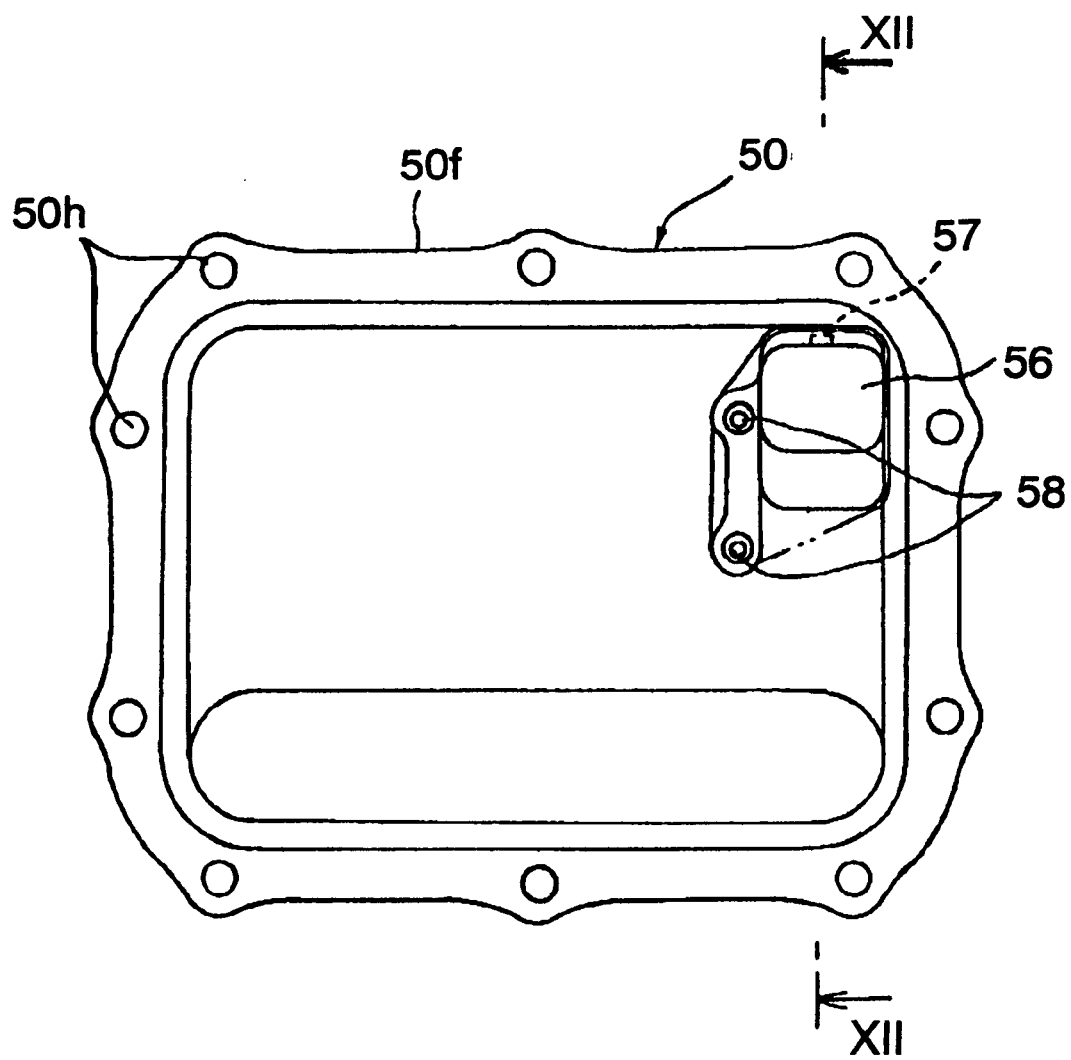
FIG. 11 is a bottom view of the front cover.
Figure 12:
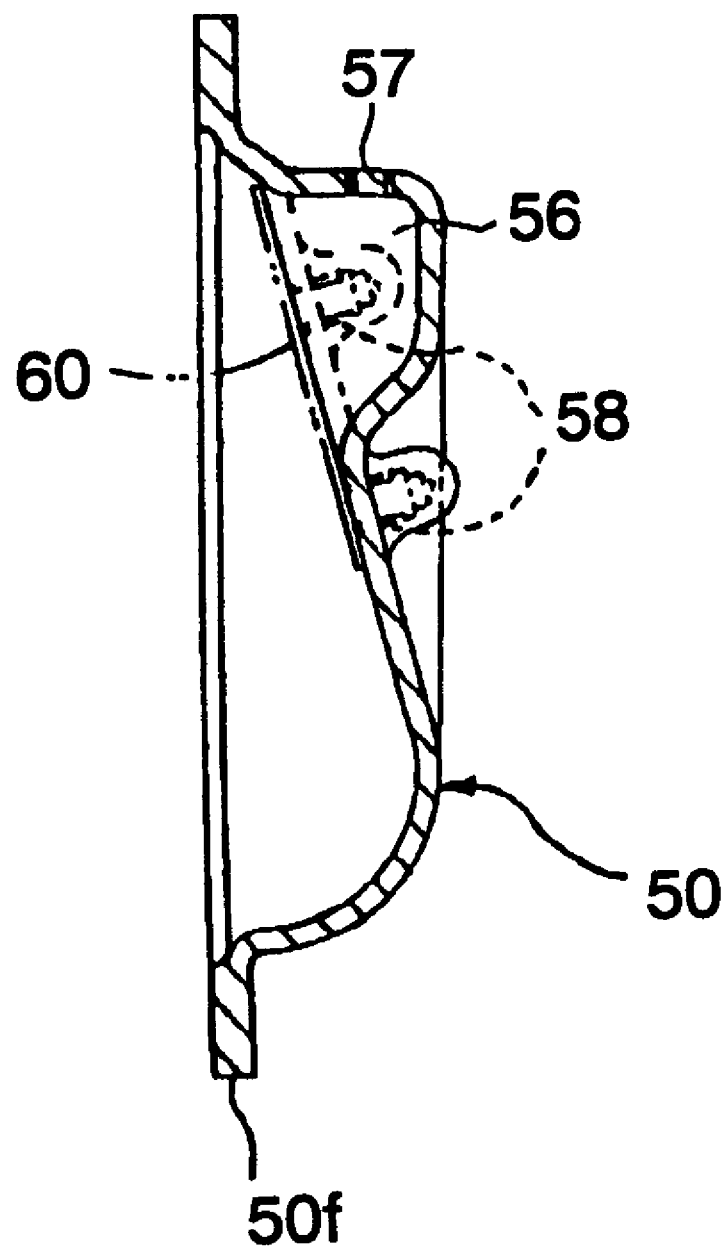
FIG. 12 is a cross-sectional view of FIG. 11 taken along line XII—XII.

As was previously mentioned, the front opening 31h provided in the front wall of the transfer housing 31 is closed by the front cover 50. This front cover 50 has a plurality of external cooling fins 51 integral therewith to cool the oil within the transfer case unit Tr. As shown in detail in FIGS. 10 through 12, the front cover 50 is made as a casting product of a light alloy such as aluminum. The front cover 50 has a generally rectangularly-shaped box with a peripheral flange 50f. A plurality of holes 50h are formed in the flange 50f, through which the fastening bolts Bt4 are fastened to secure the front cover 50 to the transfer housing 31. A breather 55 is installed to the front cover 50 to prevent internal pressure in the inside of the transfer housing 31 from rising higher than a specified level or to keep the interior of the transfer housing 31 lower than a specified pressure level. The front cover 50 at one of its corners is formed with a breather chamber 56 jutting out thereof to admit the breather 55. As clearly shown in FIG. 12, the breather chamber 56 at one of its side walls is formed with a hole 57 for access to the interior thereof. The breather 55 is installed through the access hole 57 into the breather chamber 56. Various breathers are known in the art, and the breather 55 may take any well known type. As shown in FIG. 10 and 12, an oil barrier 60 is bolted to the front cover 50 by bolts 59 (see FIG. 8) fastened into threaded bores 58 to close the major portion of the opening of the breather chamber 56 but to provide an end slot Y. The oil barrier 60 prevents oil splashes from entering the breather chamber 56.

As seen in FIGS. 7 and 8, the front cover 50 is structured to place the breather 55 located relatively far from the transfer output gear 33 and the cooling fins 51 located relatively near the transfer output gear 33 when attached to the transfer housing 31. The oil barrier 60 is attached to the front cover 50 so as to locate the end slot Y at the farthest position relative to the transfer output gear 33.

Transfer case unit Tr and the transfer housing 31 are assembled as one whole and installed to the torque converter housing 4a in a specified manner. The transfer shafts 30 and 34, the transfer gears 33 and 35 are previously installed into the transfer housing 31 to prepare a transfer unit subassembly As. Specifically, after installing the conical roller bearings J4 and J5 to the longitudinal cylindrical housing section 31b of the transfer housing 31, a standard transfer output shaft (not shown) is inserted to pressurize the conical roller bearing J4. While leaving the conical roller bearing J4 as it remains pressurized, the distance between the center axis of rotation of the transfer shafts 30 and the side surface of the inner race of the conical roller bearing J4 is measured to select a shim CM1 having an adequate thickness among different thickness of shims. After this, the standard transfer output shaft is drawn out, and the shim CM1 is fitted to a transfer output shaft 34 practically installed to the transfer case unit Tr. The transfer output shaft 34 is installed into the cylindrical housing section 31b and then a companion flange 62 is secured to the external end of the transfer output shaft 34 by means of a fastening nut 61. The front opening 31h of the transfer housing 31 makes it easy to perform insertion of the standard transfer output shaft or a transfer output shaft into the cylindrical housing section 31b and drawing it out of the cylindrical housing section 31b. Subsequently or prior to installing the transfer output shaft 34, the internal splined transfer output shaft 34 is placed on the hollow sleeve 30A at specified axial positions, and inner races of the conical roller bearings J2 and J3 are press-fitted to the hollow pipe 30A from the opposite ends. After fitting outer races of the conical roller bearings J2 and J3 onto the respective inner races, shims Cm2 and Cm3 are installed to the hollow pipe 30A so as to abut the side surfaces of the outer races. The conical roller bearings J2 and J3 are fitted to and supported by the bearing supports 51b and 51c to install the hollow sleeve 30A in the transverse housing section 31a of the transfer housing 31. At this time, the transfer output gear 33 is roughly positioned in a preparatory axial position defined between the shims Cm2 and Cm3. Positioning of the hollow sleeve 30A and transfer elements attached to the hollow sleeve 30A is easily achieved through the front opening 31h of the transfer housing 31.

When assembling of the hollow sleeve 30A is completed, the hypiod gear set, i.e. the transfer output gear 33 and the pinion gear 35, is subjected to a preliminary examination of gear contact. If these gears 33 and 35 are in inadequate contact, one of the shims Cm2 and Cm3, in particular the shim Cm2, is replaced with another one so as to determine a provisional anal position of the transfer output gear 33 for another preliminary examination of gear contact. The examination and adjustment of gear contact is achieved even before installing the transfer shaft 30 into the transfer housing 31. When the gears 33 and 35 are put in a good contact, the roller bearing J1 is fitted to the bearing support 51a of the transverse transfer housing section 31a, and the annular sealing ring S1 is fitted in a groove of the transverse transfer housing section 31a between the bearing supports 51a and 51b. After fitting the shim Cm4 to the transfer shaft 30, the transfer shaft 30 is axially inserted into the hollow sleeve 30A through one of the opposite ends of the transverse transfer housing section 31a remote from the side cover 49. The roller bearing J1 and sealing ring S1 may not always be fitted to the transverse transfer housing section 31a immediately before the adjustment of gear contact between the gears 33 and 35 but may be fitted in advance.

Shim Cm5 is fitted to the end of the transfer shaft 30 and fastened tight against the inner race of the conical roller bearing J3 with a specified torque by means of the ring fastener or fastening nut 54. As a result, the transfer output gear 33 is fixed in the proper axial position, and the conical roller bearings J2 and J3 are applied with a specified preload in the axial direction. In this condition, an examination of gear contact is made between the gears 33 and 35 for final verification. If the gears are still in inadequate contact in the final examination, after replacing, for example, the shim Cm4 with another one which is different in thickness, the transfer shaft 30 and its associated transfer case elements are re-assembled. After the verification of gear contact between the gears 33 and 35, the semi-circular caps 53 are attached to cover the bearing supports 51b and 51c, respectively and secured to the transverse housing section 31a by means of fastening bolts Bt5 for completing assembly of the transfer case unit Tr including the transfer shafts 30 and 34, the hypoid gear set 33 and 35, the bearings J1–J5 and the associated elements into the transfer housing 31.

Front and side covers 50 and 49 are attached to the transfer housing 31 to close the front and side opening, providing a complete transfer case unit sub-assembly As. The transfer case unit sub-assembly As is installed to the torque converter housing 4a in the anal direction of the transfer shaft 30 adjusting action between the differential second ring gear 15 and the transfer input gear 32. As seen in FIGS. 4 through 6 and 9, the transfer housing 31 is fixed to the torque converter housing 4a by means of a plurality of, for example four, fastening bolts Bt3. The transfer shaft 30 and the differential first ring gear 11 are designed and adapted to take their relative positions for avoiding interference with each other.

As described above, the differential first and second gears 11 and 15 such as a helical ring gears integrated as one whole have the same direction of helical threads and are commonly bolted to the differential housing 10. This integral structure of the differential first and second gears 11 and 15 reduces loads applied as sharing force to the fastening bolts and consequently reduces the number of fastening bolts or allows to use small fastening bolts, which is always desirable for overall compactness of the transfer case unit Tr.

Further, according to the transfer case unit Tr equipped with the transfer input gear 32 at one end of the transfer shaft 30 which is of a type of cantilever supported by the bearings J1–J3 in three axial positions with respect to an axial position at which an external load is applied to the transfer shaft 30, it is quite easy as compared with a transfer shaft supported at its opposite ends to design and adapt the transfer shaft 30 and the differential first ring gear 11 such that the transfer shaft 30 does not interfere in operation with the transfer input gear 32 nor impose constraint on the size of the transfer input gear 32 and, as a result of which, the latitude in the choice of reduction ratios between the transmission output gear 8 and the differential first ring gear 11 is considerably increased even in the case where the transmission output shaft 6 and the front wheel drive axle shaft 24, 25 are positioned at a specified distance between their axes of rotation. Further, because the hypoid type of transfer output gear 33 which transmits engine output power to the transfer output shaft 34 is located closer to the center bearing J2 interposed between the bearings J1 and J3 installed to the transfer shaft 30, it effectively restricts its own positional change in a radial direction, so as thereby to reduce a change in gear contact area of the transfer output gear 33 with respect to the pinion gear 35. That is, while the cantilevered transfer shaft 30 remains effective in providing an increased latitude in the choice of reduction ratios between the transmission output gear 8 and the differential first ring gear 11, the hypoid gears 33 and 35 are meshed with an effect of reducing grinding noises and improving their hives under operation.

A subassembly of the transfer case unit Tr and the transfer housing 31 is installed to the transmission housing 4, in particular to the torque converter housing 4a, which makes contribution to easy assembling work. The transfer case structure in which the transfer output gear 33 is fixedly mounted on the hollow sleeve 30A fixedly fitted to the transfer shaft 30 by means of, for example, a spline engagement and supported for rotation by the transfer housing 31 through the bearings J2 and J3 permits an examination of gear contact between the hypoid gear set 33 and 35 even before installing the transfer shaft 30 to the transfer case unit Tr, which always makes it easy to make an examination of gear contact between the hypoid gear set 33 and 35 and re-adjustment gear contact between the hypoid gear set 33 and 35 when needed. The hollow sleeve 30A at its opposite ends is supported by the bearings J2 and J3 which have high structural rigidity in an axial direction. The employment of conical roller bearings J2 and J3 is desirable for the differential first ring gear 11, which is a hypoid gear, to be positioned in an accurate axial position. The sealing ring S1 for separating and closing up tightly spaces on opposite sides of the transfer input gear 32, which is disposed between the two bearings J1 and J2 disposed between the transfer input and output gears 32 and 33 to strictly restrain a change in position of the transfer shaft 30 in a radial direction, is effectively prevented from deformation while the transfer shaft 30 rotates under load and consequently is prolonged in life.

Detachable front cover 50 provided with integral cooling fins 51 may be replaced with another according to conditions of the transfer case Tr, such as the rotational speed of the transfer shaft 30, the temperature of the engine En and the position of the transfer case relative to the engine En, which have an effect on temperature in the interior of the transfer case Tr. Further, if the transfer case Tr has no necessity to be provided with the breather 55, another detachable front cover without a breather may be attached to the transfer housing 31. Consequently, the transfer housing 31 can be applied commonly to different models of power transfer system.

Breather 55 incorporated in the front cover 50 is positioned relatively far from the hypoid gears 33 and 35 and covered by the oil barrier 60 leaving a allow end slot Y, so that the breather 55 is prevented from being splashed with oil by the hypoid gears 33 and 35, getting clogged with oil and dust and letting oil leak out of the transfer housing 31. The end slot Y located in the furthest position from the hypoid gears 33 and 35 prevents the most part of oil splashes caused by the hypoid gears 33 and 35 from entering the breather chamber 56. The cooling fins 51 integral with the front cover 50 are closer to the hypoid gears 33 and 35 than the breather 55 and consequently splashed with many oil splashes, which is desirable to cool the lubrication oil in the transfer housing 31. The detachable front cover 50 provides a high positional latitude of cooling fins and breather.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A transfer case for a four-wheel drive vehicle that is equipped with a transversely mounted engine, a transmission connected to said engine through an engine output shaft and to a differential having a differential housing through a transmission output gear, a first wheel drive axle assembly which includes a first wheel drive axle shaft arranged in parallel to said engine output shaft and connected to the transmission output gear and a second wheel drive axle assembly which includes a second wheel drive axle arranged in parallel to said engine output shaft, said transfer case comprising:

a transfer shaft arranged in parallel to said engine output shaft and operative to transfer engine output to said second wheel drive axle, said transfer shaft having a transfer input gear;

a first helical ring gear meshed with said transmission output gear;

a second helical ring gear meshed with said transfer input gear;

wherein said first and second helical ring gears are formed with helical threads in a same direction and united as an one-piece article secured to said differential housing.

2. The transfer case as defined in claim 1, wherein said first helical ring gear is bolted to said differential housing to secure said first and second ring gears as one-piece article to said differential housing.

3. The transfer case as defined in claim 1, wherein said first helical ring gear has a facewidth larger than said second helical ring gear.

4. The transfer case as defined in claim 1, wherein said differential housing is divided into two housing sections formed with mating flanges, respectively.

5. The transfer case as defined in claim 1, and further comprising a transfer housing formed with an opening through which transfer shafts and transfer gears are installed and a detachable cover for closing said opening, said cover being provided with cooling means for cooling the interior of said transfer housing.

6. The transfer case as defined in claim 5, wherein said cooling means comprises a plurality of external fins integrally formed with said detachable cover.

7. The transfer case as defined in claim 1, and further comprising a transfer housing formed with an opening through which transfer shafts and transfer gears are installed, a detachable cover for closing said opening and breathing means installed to said detachable cover for assisting ventilation of said transfer housing to keep interior pressure in said transfer housing lower than a specified pressure level.

8. The transfer case as defined in claim 1, and further comprising a transfer housing formed with an opening through which transfer shafts and transfer gears are installed, a detachable cover for closing said opening, said opening being directed to a front of a vehicle body.

9. The transfer case as defined in claim 1, and further comprising a transfer housing formed with an opening through which transfer shafts spatially perpendicular to each other and bevel gears mounted on said transfer shafts, respectively, and meshed with each other are installed and a detachable cover for closing said opening, said detachable cover being provided with cooling means for cooling the interior of said transfer housing and breather means disposed far from said transfer gears with respect to said cooling means for assisting ventilation of said transfer housing to keep interior pressure in said transfer housing lower than a specified pressure level.

10. The transfer case as defined in claim 9, wherein said transfer shafts and said transfer gears are installed into said transfer housing through said opening to provide a subassembly so as to be ready to be attached to said transmission.

* * * * *